(12) United States Patent
Bullman et al.

(10) Patent No.: US 6,574,237 B1
(45) Date of Patent: Jun. 3, 2003

(54) INOPERABLE NETWORK DEVICE

(75) Inventors: William R. Bullman, Bethlehem, PA (US); Steven E. Strauss, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/343,828

(22) Filed: Jun. 30, 1999

Related U.S. Application Data
(60) Provisional application No. 60/125,104, filed on Mar. 19, 1999.

(51) Int. Cl.[7] .................................................. H04J 3/02
(52) U.S. Cl. ....................................... 370/465; 370/474
(58) Field of Search ................................ 370/445, 465, 370/466, 474, 400, 401, 389; 709/232, 233, 246

(56) References Cited

U.S. PATENT DOCUMENTS

| | | | | |
|---|---|---|---|---|
| 5,077,732 A | * | 12/1991 | Fischer et al. ............... | 370/437 |
| 5,548,727 A | * | 8/1996 | Meehan .................. | 395/200.13 |
| 5,701,514 A | * | 12/1997 | Keener et al. ............... | 395/834 |
| 5,758,194 A | * | 5/1998 | Kuzma ......................... | 710/66 |
| 6,085,236 A | * | 7/2000 | Lea ............................. | 709/220 |
| 6,195,365 B1 | * | 2/2001 | Toillon ........................ | 370/468 |
| 6,389,476 B1 | * | 5/2002 | Olnowich .................... | 709/233 |

* cited by examiner

Primary Examiner—Min Jung
(74) Attorney, Agent, or Firm—William H. Bollman

(57) ABSTRACT

A networking device includes a legacy preamble injector that inserts a legacy preamble based on an indication that a legacy device is coupled to a common network. The legacy preamble injector inserts the legacy preamble if a legacy device is a target device for communication from a network appliance. Alternately, a device may be adapted to output a payload portion at a native rate, for example, if a legacy device is not a target. A Home Phone Line Network Alliance (HomePNA) system includes a telephone line network and a plurality of devices couple to the telephone line network. The plurality of devices may include at least one V2.x device and at least one V1.x device. The at least one V2.x device is adapted to recognize a presence on the telephone line network of at least one V1.x device, and to modify a transmission frame format based on this recognition.

17 Claims, 2 Drawing Sheets

INOPERABLE NETWORK DEVICE

This application claims priority to provisional patent application No. 60/125,104, filed on Mar. 19, 1999, which is incorporated herein by reference.

FIELD OF THE INVENTION

This invention is directed to the field of networking devices, such as networking appliances coupled to a home network.

BACKGROUND OF THE INVENTION

The Home Phone-Line Networking Alliance (HomePNA) is an industry-sponsored Special Interest Group creating a standard for networking of information appliances via the telephone lines within a home or other building. The network communications occur at a high frequency, so that they do not interfere with conventional telephone conversations or digital subscriber line (DSL) communications. There is currently a HomePNA 1.0 standard that operates at approximately 1 Mbps (Mega-bits per second). The HomePNA is working to establish a 2.0 standard that operates at approximately 10 Mbps. Devices that operate according to the 1.0 standard are often referred to as version 1 or V1.x devices, and devices that operate according to the 2.0 standard are often referred to as version 2 or V2.x devices.

Both the 1.0 and 2.0 HomePNA standards operate according to Ethernet principles, as described in the IEEE 802.3 standard, which is incorporated herein by reference. A well-known principle of the 802.3 standard is known as CSMA/CD, which stands for Carrier Sense Multiple Access/ Collision Detect. Essentially, CSMA/CD enables any device to transmit, as long as no other devices are transmitting. Each device, prior to transmitting, checks to see if the medium is free (carrier sense) and only transmits if the device senses that the medium is free. If two or more devices sense the medium is free, and transmit simultaneously, a collision is detected and the devices back off according to a predetermined protocol. The devices will then subsequently retry to transmit, according to the protocol.

One of the requirements of V2.x devices is that they are compatible with V1.x devices, also referred to as "legacy" devices. Thus, if a user has a first computer operating according to the V1.x standard, and a second computer operating according to the V2.x standard, the second computer must act in a way that is compatible with the first computer if both computers are active and coupled to a common network. This compatibility includes two primary requirements. First, the V2.x device must be able to communicate with the V1.x device. Second, the V2.x device must operate in a way that enables the V1.x device to recognize that the V2.x device is operating, even if the V2.x device is communicating with another V2.x device.

The conventional view is that when there is a mixed version HPNA system (i.e., at least one V1.x device and at least one V2.x device), when node detection occurs and a V2.x device detects the presence of a V1.x device, the entire link will drop back to the V1.x rate. This drop back procedure is inefficient since it will cause communication between two V2.x devices to occur at the V1.x rate. However, the conventional view is that the drop back procedure is necessary so that V1.x devices can sense the communication between the two V2.x devices, and not erroneously disrupt the communication by attempting to transmit. This approach is inadequate because it does not take advantage of the V2.x capabilities, and instead acts as if the entire network is made of V1.x nodes.

An alternative approach employs separate frequency spectra for each type of device when in a mixed-mode topology. According to this approach, an advanced (e.g. V2.x) device will communicate with other advanced devices at one (e.g. higher) frequency, and will communicate with legacy (e.g. V1.x) devices at a separate (e.g. lower) frequency. This alternative approach is not adequate because at higher frequencies significant design challenges are made even more difficult. Also, this approach leads to higher cost system designs. At higher frequencies, some of the design challenges are that Near End Crosstalk (NEXT) is more pronounced, line attenuation gets worse, spectral nulls become deeper and wider, and the technical specifications required to introduce product into the consumer marketplace based on FCC Part 15 requirements become more stringent. Due to these technical constraints, the conventional wisdom is that the spectral sharing concept, e.g. where legacy and advanced devices share the same frequency band, is the preferred approach.

What is needed is a system that allows for compatibility of future versions of home networking appliances with older versions, without causing the entire network to drop back to the speed of the older version, and without the design complexity of the high frequency alternative.

SUMMARY OF THE INVENTION

In a first embodiment according to the invention, a networking device includes a legacy preamble injector adapted to insert a legacy preamble based on an indication that a legacy device is coupled to a common network. The legacy preamble injector may be adapted to insert the legacy preamble if the legacy device is a target device for communication from the network appliance. Alternatively, the device may be adapted to output a payload portion at a native rate, for example, if the legacy device is not the target.

An exemplary embodiment is a Home Phone Line Network Alliance (HomePNA) system, including a telephone line network, and a plurality of devices coupled by the network. The plurality of devices may include at least one V2.x device and at least one V1.x device. According to the invention, the at least one V2.x device is adapted to recognize the presence on the network of the at least one V1.x device, and to modify a transmission frame format based on this recognition.

In an alternative embodiment according to the invention, a method of communicating on a telephone line network includes the steps of recognizing the presence on the network of a relatively low speed device, and injecting a preamble at a rate corresponding to the relatively low speed device. According to this method, a payload portion at the rate corresponding to the relatively low speed device may be transmitted if the relatively low speed device is a target device. Alternatively, a payload portion at a rate corresponding to a relatively high speed device may be transmitted if a relatively high speed device is a target device.

A networking appliance according to the invention is thus adapted to send out a frame that allows legacy terminals to demodulate valid preamble. This allows legacy terminals to maintain carrier sense for the duration of the packet. In one embodiment, this is accomplished by adding a valid legacy preamble followed by advanced native rate format and payload data in a heterogeneous network. While data throughput may be degraded when compared to that of a homogenous advanced network, the end user will experience greater data throughput than can be expected in a legacy-only topology or the full fallback implementation in a heterogeneous topology.

BRIEF DESCRIPTION OF THE DRAWINGS

These and other advantages of the invention will be apparent to one of skill in the art upon review of the following detailed description in light of the drawing, wherein.

DETAILED DESCRIPTION

Figure 1:
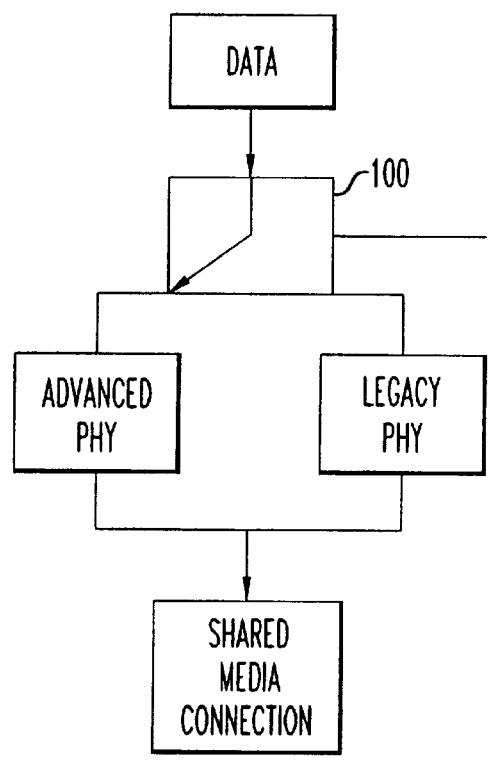
FIG. 1 is a simplified block diagram showing an exemplary multiplexing scheme wherein both advanced and legacy device paths are considered.

It is valuable to be able to distinguish the advanced capabilities of attached stations in order that the home network can operate in the most efficient, highest performance mode. According to the invention, upon detection of the presence of a V1.x or legacy device, an advanced terminal (e.g. a V2.x device) tags the system as a mixed mode topology, and modifies the preamble of the native mode frame (e.g. a V2.x frame) by prepending a valid V1.x Access ID (AID) to the native mode frame. During the payload portion, if communicating with a V2.x device, the V2.x transmitting device continues to send packets out in its native format and frame structure. In this mixed mode topology, the advanced terminal data throughput is greater than a complete fallback to V1.x legacy rates.

Assuming that multiple generations of CSMA/CD LAN protocols concurrently operate on the wire, share the same spectrum, and differ in modulation types and frame formats, there are two goals of backwards compatibility. A first is to ensure that different generations of HomePNA products can interleave frames on the wire without interfering with each other (compatibility) and a second is that later generation products can communicate with earlier generations (interoperability). It is highly desirable to ensure that later generations of terminals based on the HomePNA specifications are able to communicate at native rates using native modulation schemes even in the presence of mixed mode topology. For example, the V1.x specification (assuming that V1.x devices incorporate the Link Integrity scheme contained in version 1.1 of the HPNA Technical Committee specification) operates at approximately 1 Mbps on the wire. The specifications for the V2.x technology, on the other hand, achieve data rates in the 10 Mbps range.

In one embodiment, the invention takes advantage of an aspect of the V1.x HomePNA specification, which lacks a definition of system behavior when presented with signals of a format different from V1.x signals, such as those used by a future specification. In particular, the V1.x specification allows implementations that are very prone to detecting foreign transmissions as noise events, resulting in noise threshold adjustments that could render a V1.x terminal incapable of reception. Due to the bursty nature of the data present in home networks, however, legacy nodes will be able to gain entrance into the conversation. This will permit node detection by enhanced generation HomePNA terminals, according to the invention.

Further, HomePNA V1.x terminals require a threshold crossing within some time-out period to initiate and maintain carrier. At defined intervals, other transitions are required to maintain this carrier state. This requirement is an issue only during the V1.x preamble, thus enabling enhanced terminals to "spoof" the Legacy terminal into believing that valid signals are present on the wire according to the invention. Of course, enhanced payload data will appear as noise to a legacy terminal and will be disregarded by upper order protocols in the worst case.

One way to implement the concept of the invention is to have a small application layer program which "walks" the user through informing the driver code if a legacy terminal is present in the system. If the user desires or understands that only enhanced terminals would ever be in the conversation, then the driver would never attempt to detect the presence of legacy nodes within the system. This is a simplistic implementation, and could have negative repercussions if the user at some time later introduces a legacy device into the system and does not inform the enhanced terminal driver accordingly.

Therefore, in an alternative embodiment according to the invention, a default state of the driver assumes that legacy devices are indeed present in the system. The driver periodically "chirps" or queries the line utilizing the modulation type, frame format, and link integrity format of the HPNA V1.x specifications in an attempt to isolate any legacy devices. This chirp does not need to be specifically for discovery. Most systems will attempt to ascertain their network address and will transmit a network address query. The mixed mode endpoint decodes the legacy packet and then sets the corresponding controls for multimode operation.

It is valuable to be able to distinguish the advanced capabilities of attached stations in order that the home network can operate in the most efficient, highest performance mode. Upon detection of the presence of a V1.x node, an advanced terminal tags the system as a mixed mode topology and modifies the preamble of the native mode frame by prepending a valid V1.x Access ID (AID) to the native mode frame. During the payload portion, the V2.x terminal continues to send packets out in its native format and frame structure if the destination of the current packet is to another V2.x station.

From an OSI stack viewpoint, the layer 2 data is identical between legacy and advanced terminals, e.g. IEEE 802.3 MAC frames. The software stacks do not notice any difference between the Ethernet and either of these different terminal topologies. Both legacy and advanced terminals employ IEEE 802.3 CSMA/CD at the physical layer, but the differences occur in that the format of the electrical signaling is unique to the two implementations. At this physical level the HomePNA hardware strips the original Ethernet MAC header and prepends its own unique parameters which are then used to accurately characterize the physical media, set network speeds, set up parameters which allow the receiver to extract timing, etc.

Figure 2:
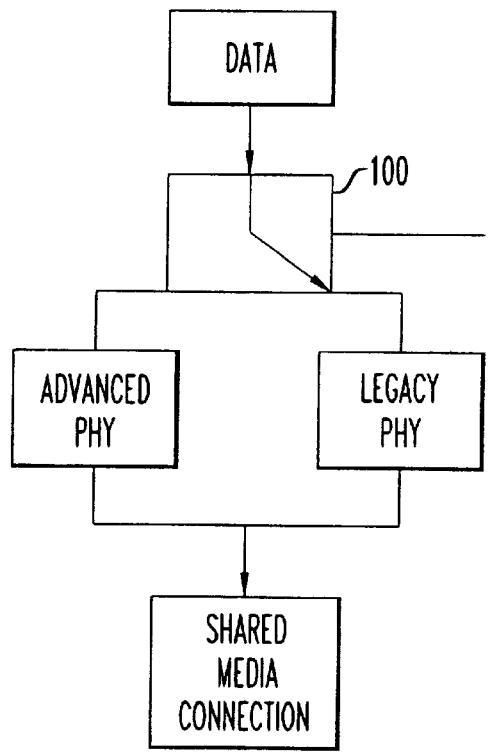
FIG. 2 is a simplified block diagram of the multiplexing scheme of FIG. 1, when a legacy mode is active.

FIGS. 1 and 2 show an exemplary multiplexing scheme in which both advanced and legacy node paths are considered. Data path multiplexer 100 is either in a first position (FIG. 1) or a second position (FIG. 2). In systems in which only advanced terminals exist (FIG. 1), the data path multiplexer 100 is set in the first position. In topologies where an advanced node is mixed with all legacy nodes, the data path multiplexer 100 is set in the second position, as shown in FIG. 2. Some consideration at the driver level is given to recognizing when nodes come onto and off of the home network. The ability to configure a system to recognize this is within the capabilities of one of ordinary skill in the art, and is not described here in detail. The resulting data may be used to optimize or establish the settings of data path multiplexer 100.

Figure 3:
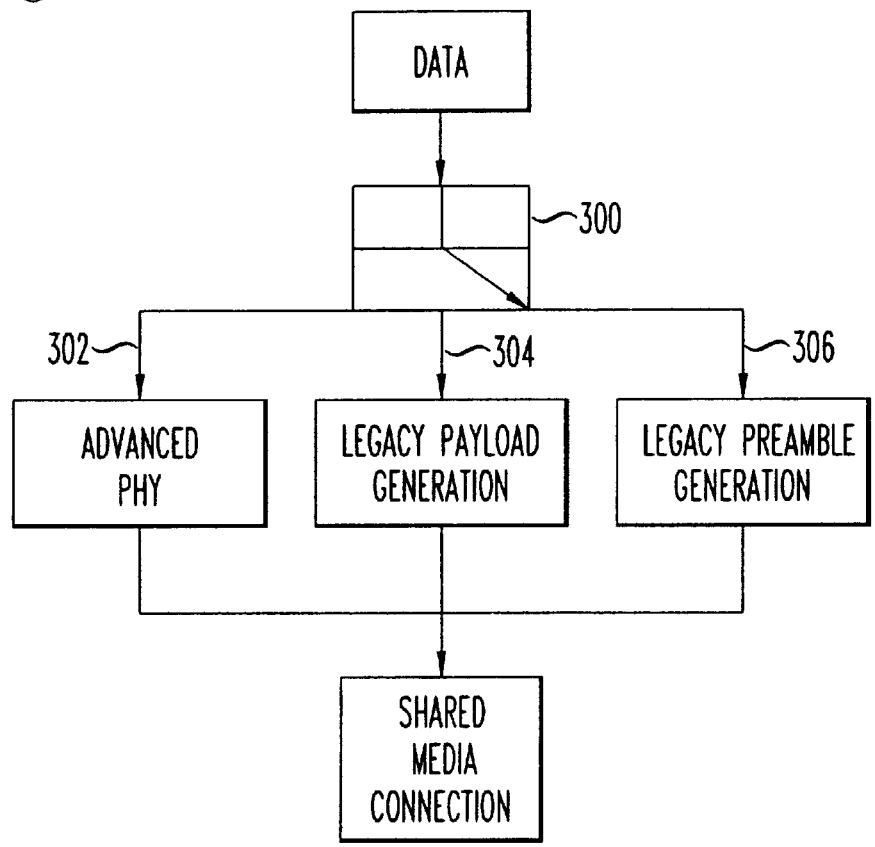
FIG. 3 is a simplified block diagram of an exemplary hardware solution for isolated heterogeneous networks.

FIG. 3 shows an exemplary hardware solution that is employed for mixed-mode networks. Data path multiplexer 300 is configured to be in one of a first position (path 302), a second position (path 304) and a third position (path 306, as configured in the figure). In this mixed mode multi-nodal network, during a V2.x terminal to V2.x terminal packet transfer, data path multiplexer 300 will be in the third position (306) as shown in the figure to initially support Legacy Preamble Generation. At the end of this preamble, data path multiplexer 300 then switches to the first position 302 in the Advanced PHY data path. During a V2.x terminal to V1.x terminal packet transfer process, the data path multiplexer 300 will switch to the second position (304) to support the Legacy data path only.

Figure 4:
FIG. 4 provides an exemplary frame format for use in a mixed mode topology according to the invention.

A frame structure for V2.x to V2.x communication during a mixed mode network is shown in FIG. 4. A legacy (V1.x) preamble portion 402 of packet 400 is created when data path multiplexer 300 is in the third position. In a subsequent portion of the frame, an advanced (V2.x) payload portion 404 is created when the data path multiplexer 300 is in the first position. Packet 400 may include additional portions, such as an advanced preamble, although any form of packet 400 including the portions 402 and 404 is intended to fall within the scope of the invention.

It should be noted that the inventive scheme may result in degraded performance when compared to a homogeneous (non-mixed) enhanced terminal configuration, in that the inventive scheme prepends a valid V1.x preamble on a per packet basis once a legacy terminal is isolated. In the time domain, enhanced (V2.x) stations should therefore remain on the media for more time when in a mixed-mode network than when in a homogeneous network topology. This slight data degradation, however, is more than acceptable if one considers that all transmission would be brought back to V1.x rate by employing conventional approaches.

In one embodiment according to the invention, the driver can include some intelligence, such that if a legacy device is not isolated in some reasonable amount of attempts, then the legacy frame repeat algorithm is dropped and the V2.x frame format is used exclusively except for periods of line snooping for the presence of legacy terminals. In an alternative embodiment, all legacy terminals can be required to send out the Link Integrity sequence.

The invention thus provides a Digital Signal Processing (DSP)-based technique that can be implemented with relative ease and requires no modification to the existing HPNA V1.x silicon-based solutions currently deployed in the marketplace. This advantage is important because, due to the cost effectiveness of the V1.x solution, multiple devices in consumer space will likely become linked to desired high speed home networked devices and computers for the purposes of automation and data sharing.

What is claimed is:

1. A networking appliance, comprising:
   a sensor to recognize a presence on a network of a relatively low speed device by a relatively high speed device; and
   a legacy preamble injector to insert a legacy preamble for transmission at a rate corresponding to said relatively low speed device into a native data frame including data at a rate corresponding to said relatively high speed device, based on an indication that a legacy device is coupled to a native network, said native network being different from a legacy network.

2. A networking appliance as recited in claim 1, wherein:
   said networking appliance outputs said native data frame with said legacy preamble at a legacy rate and a payload portion at a native rate.

3. A networking appliance, comprising:
   a sensor to recognize a presence on a network of a relatively low speed device by a relatively high speed device; and
   a legacy preamble injector to insert a legacy preamble for transmission at a rate corresponding to said relatively low speed device into a native data frame including data at a rate corresponding to said relatively high speed device, based on an indication that a legacy device is a target device for communication from a native network appliance, coupled to a native network, said native network being different from a legacy network.

4. A system, comprising:
   a telephone line network; and
   a plurality of devices coupled by the telephone line network,
   wherein the plurality of devices includes at least one relatively high speed device and at least one relatively low speed device, and
   wherein the at least one relatively high speed device recognizes a presence on the telephone line network of the at least one relatively low speed device, and modifies a transmission frame format based on this recognition to include both a relatively low speed portion for transmission at a rate corresponding to said relatively low speed device and a relatively high speed portion for transmission at a rate corresponding to said relatively high speed device, in a same data frame.

5. A system as recited in claim 4, wherein:
   the relatively low speed portion is a preamble.

6. A system as recited in claim 4, wherein:
   the relatively high speed portion is a payload portion of the data frame.

7. A system as recited in claim 4, wherein:
   a preamble portion of the data frame includes a portion at a data rate corresponding to the at least one relatively high speed device and a portion at a data rate corresponding to the at least one relatively low speed device.

8. A Home Phone Line Network Alliance (HomePNA) system, comprising:
   a telephone line network; and
   a plurality of devices coupled by the telephone line network,
   wherein the plurality of devices includes at least one V2.x device and at least one V1.x device, and
   wherein the at least one V2.x device recognizes a presence on the telephone line network of the at least one V1.x device, and modifies a transmission frame format based on this recognition to include both a V2.x portion for transmission at a rate corresponding to said relatively high speed device and a V1.x portion for transmission at a rate corresponding to said relatively low speed device, in a same data frame.

9. A system as recited in claim 8, wherein:
   the V1.x portion is a preamble.

10. A system as recited in claim 8, wherein:
    a payload portion of the data frame is transmitted at a data rate corresponding to the V2.x device.

11. A system as recited in claim 8, wherein:

a preamble portion of the data frame includes a portion at a data rate corresponding to the V2.x device and a portion at a data rate corresponding to the V1.x device.

12. A V2.x HomePNA networking device, comprising:

a sensor to recognize a presence on a network of a V1.x device by a V2.x device; and a V1.x preamble injector to insert a V1.x preamble for transmission at a relatively low speed rate within a V2.x data frame wherein the portion of the V2.x data frame excluding the preamble is transmitted at a relatively high speed rate, based on an indication from said sensor that a V1.x device is coupled to a V2.x HomePNA network.

13. A V2.x HomePNA networking device as recited in claim 12, wherein:

the V1.x preamble injector is further adapted to output a payload portion at a V2.x rate if another V2.x device is a target device for communication over the V2.x HomePNA network including a V1.x device.

14. A method of communicating on a telephone line network by a relatively high speed device, comprising:

recognizing a presence on the telephone line network of a relatively low speed device by the relatively high speed device; and injecting a preamble for transmission at a rate corresponding to the relatively low speed device into a data frame including data at a rate corresponding to the relatively high speed device, for transmission by the relatively high speed device.

15. A method as recited in claim 14, further comprising:

transmitting a payload portion of said data frame at a rate corresponding to the relatively high speed device if another relatively high speed device is a target device.

16. A method as recited in claim 14, wherein:

the relatively high speed device is a HomePNA V2.x device; and the relatively low speed device is a HomePNA V1.x device.

17. A method of communicating on a telephone line network by a relatively high speed device, comprising:

recognizing a presence on the telephone line network of a relatively low speed device by the relatively high speed device;

injecting a preamble for transmission at a rate corresponding to the relatively low speed device into a data frame including data at a rate corresponding to the relatively high speed device, if the relatively low speed device is a target device, for transmission by the relatively high speed device.

\* \* \* \* \*